United States Patent
Neves et al.

(10) Patent No.: US 11,477,189 B2
(45) Date of Patent: Oct. 18, 2022

(54) PRIMARY DOMAIN AND SECONDARY DOMAIN AUTHENTICATION

(71) Applicant: salesforce.com, inc., San Francisco, CA (US)

(72) Inventors: João Henrique Pimentel Wanderley Neves, Tampa, FL (US); Alan Vangpat, Pittsburgh, PA (US)

(73) Assignee: salesforce.com, inc., San Francisco, CA (US)

( * ) Notice: Subject to any disclaimer, the term of this patent is extended or adjusted under 35 U.S.C. 154(b) by 158 days.

(21) Appl. No.: 16/926,224

(22) Filed: Jul. 10, 2020

(65) Prior Publication Data

US 2022/0014513 A1   Jan. 13, 2022

(51) Int. Cl.
 *H04L 9/40*   (2022.01)
(52) U.S. Cl.
 CPC .......... *H04L 63/0838* (2013.01); *H04L 63/06* (2013.01); *H04L 63/0846* (2013.01)
(58) Field of Classification Search
 CPC . H04L 63/0838; H04L 63/06; H04L 63/0846; H04L 9/40
 See application file for complete search history.

(56) References Cited

U.S. PATENT DOCUMENTS

| | | | |
|---|---|---|---|
| 8,850,219 B2 | 9/2014 | Dapkus et al. | |
| 9,015,469 B2 | 4/2015 | Prince et al. | |
| 9,178,701 B2 | 11/2015 | Roth et al. | |
| 9,509,508 B2 | 11/2016 | Gammel et al. | |
| 9,525,684 B1* | 12/2016 | Brandwine | G06F 21/64 |
| 10,084,838 B2 | 9/2018 | Gordon et al. | |
| 2010/0268948 A1* | 10/2010 | Matsukawa | H04L 9/0822 713/168 |
| 2014/0169557 A1* | 6/2014 | Gammel | H04L 9/0668 380/44 |
| 2018/0212965 A1* | 7/2018 | Kantorovskiy | H04L 63/0807 |

* cited by examiner

*Primary Examiner* — Jayesh M Jhaveri
(74) *Attorney, Agent, or Firm* — Kowert, Hood, Munyon, Rankin & Goetzel, P.C.; Dean M. Munyon; Mark D. Seegers (57) ABSTRACT

A computer system receives a first request as part of a primary session with a client device to access information stored on a primary domain associated with the computer system. The first request includes an authentication key that was generated using a session key. The computer system receives a second request as part of a sub-session with the client device to access information stored on a secondary domain associated with the computer system. The second request includes a second authentication key that includes a session identifier of the primary session and a session payload generated using the session key and an indicator of the secondary domain. The computer system determines whether to grant the first and second requests using the first and second authentication keys, respectively.

19 Claims, 7 Drawing Sheets

PRIMARY DOMAIN AND SECONDARY DOMAIN AUTHENTICATION

BACKGROUND

Technical Field

This disclosure relates generally to securing communication between a computer system and a client device, particularly through the use of authentication credentials.

Description of the Related Art

Computers system that are accessible by users over the Internet must ensure that users are authenticated to protect data stored on the computer system from attacks. For example, private or proprietary information might be stored on a computer system that is meant to be accessed by authenticated users for legitimate purposes, but such information might be costly or damaging if it were released publicly, fell into competitors' hands, or was sold on the black market. Authentication techniques such as the use of user names and passwords can help ensure security. Authentication credentials such as tokens stored at or generated by a client device and authenticated by the computer system prior to permitting access can also help ensure security.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computer system configured to generate" is intended to cover, for example, a computer system has circuitry that performs this function during operation, even if the computer system in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, references to "first" and "second" client devices would not imply an ordering between the two unless otherwise stated.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

As used herein, the term "platform" refers to an environment that includes a set of resources that enables some functionality (for example, in the context of the present disclosure, providing secured communications sessions). In some cases, this set of resources may be software resources, such that a platform may be said to be constituted solely of software. In other instances, the set of resources may include software and the hardware on which the software executes. Still further, the resources may constitute specialized hardware that performs the functionality; such specialized hardware may, in some cases, utilize firmware and/or microcode in order to execute. ("Modules" are one type of resource; a given module is operable to perform some portion of the overall functionality of a platform.) The term "platform" is thus a broad term that can be used to refer to a variety of implementations. Unless otherwise stated, use of the term "platform" in this disclosure will be understood to constitute all possible types of implementations unless otherwise stated. Note that a platform need not be capable by itself of performing the specified functionality. Rather, it need only provide the capability of performing the functionality. For example, an automated decision-making platform according to the present disclosure provides resources for performing automated decision making; users may utilize the platform to carry out instances of automated decision making. Embodiments of the automated decision-making platform described herein thus enable the functionality of automated decision making to be performed.

As used herein, a "module" refers to software and/or hardware that is operable to perform a specified set of operations. A module may in some instances refer to a set of software instructions that are executable by a computer system to perform the set of operations. Alternatively, a module may refer to hardware that is configured to perform the set of operations. A hardware module may constitute general-purpose hardware as well as a non-transitory computer-readable medium that stores program instructions, or specialized hardware such as a customized ASIC.

DETAILED DESCRIPTION

In order to protect users and computer systems from certain kinds of security compromises, computer systems establish separate, but potentially related, authentication credentials across different network domains. These authentication credentials can be used to secure "sessions" with the various different network domains. As used herein, a "session" is a temporary and interactive information interchange between two or more communicating devices, or between a computer and user (e.g., a login session). As used herein, a "network domain" (or simply "domain") is an administrative grouping of multiple private computer networks or hosts within the same infrastructure. Different sessions with different domains may be secured using different authentication credentials such that when one of those credentials is compromised (by malicious Javascript, for example), the others remain uncompromised. Moreover, in computer systems where domains are separated by functionality with checks limiting the ability of domain-specific authentication credentials to be used (e.g., to only what that domain's functionality enables), the risk to the system from a compromised session is further reduced.

A computer system may implement a session with a primary domain (also referred to herein as a "primary domain session" or "primary session") that is associated with one or more sub-sessions with secondary domains. For example, a computer system may implement one or more secondary domains for user-uploaded content (e.g., documents, scripts) that are separate from a primary domain for a user interface that facilitates the display of such content. A primary session may be established when a user logs in (e.g., to the primary.domain.com domain). When the user accesses a document that was uploaded by another user, that document is instead accessed on a separate domain (e.g., a "content" domain like images.secondarydomain.com) in a first sub-session, and when the user visits a custom webpage that their administrator has created, that webpage is accessed on yet another domain (e.g., a "custom webpage" domain, customwebpage.secondarydomain.com) in a second sub-session. The sessions and sub-session in these different domains have different levels of access and are locked to their appropriate domain. This separation provides security because stolen sessions cannot be generally used to pull data from the organization across domains (e.g., a stolen "content" domain session cannot be used to access the primary domain or the "custom webpage" domain). The computer system may secure communication in all three sessions through the use of separate authentication credentials that the computer system uses to authenticate client devices accessing the various domains. These primary domain and secondary domain authentication credentials are associated in the computer system such that when a user is accessing a user interface to view user-uploaded content, the user is using both the primary session and the sub-session to load the user interface. Further, a primary session and its associated sub-sessions should also be terminated together (e.g., through expiration of the primary session, as a result of a user log-out command).

If authentication credentials for a primary session and sub-sessions are separately maintained, however, enforcing the association between the primary session and a secondary session requires increased complexity and computational overhead. For example, the primary session and sub-sessions may be tracked using individual records in a database. Creation and maintenance of these database records imposes computational overhead on the computer system. The computer system has to synchronize expirations, terminations, and time-outs between a primary session and a sub-session, for example. Similarly, maintaining and using separate authentication credentials for a primary session and sub-sessions also imposes increased complexity and computational overhead for the client device. If the client device is accessing the computer system through a web browser, each authentication credential is stored on the computer system (e.g., in one or more separate cookies). If the client device is accessing the computer system though a dedicated app (e.g., a mobile app), the dedicated app must also be operable to maintain various different credentials. While associated sessions are ideally managed together such that a sub-session does not expire while its primary session is still valid, if a problem has occurred and a sub-session has been improperly terminated, user experience may be degraded (e.g., requested content such as images might not displayed on the client device as it should). Additionally, the client device would preferably be operable to handle such improper terminations and determine which sub-session should be renewed, which might add further complexity.

The present disclosure recognizes that if the sub-session authentication credentials could be derived from authentication credentials for the primary session (but still maintaining the security benefits of using separate authentication credentials), such complexity and overheard would be reduced, leading to increased performance. For example, the computer system that authenticates the authentication credentials might only need to maintain a single database entry for the primary session (rather than separate entries for the primary session and its sub-sessions). Further, the need to enforce associations between a primary session and its sub-sessions might be eliminated. On the client device side, if only one set of authentication information is used for the primary session and the sub-sessions, storage of the authentication information is simplified. Moreover, if the authentication credentials for the sub-session were derived from the authentication credentials for the primary session, then the validity of sub-sessions can be tied to the validity of the primary session such that when the primary session expires or is terminated, all the sub-secessions are rendered invalid.

Figure 1:
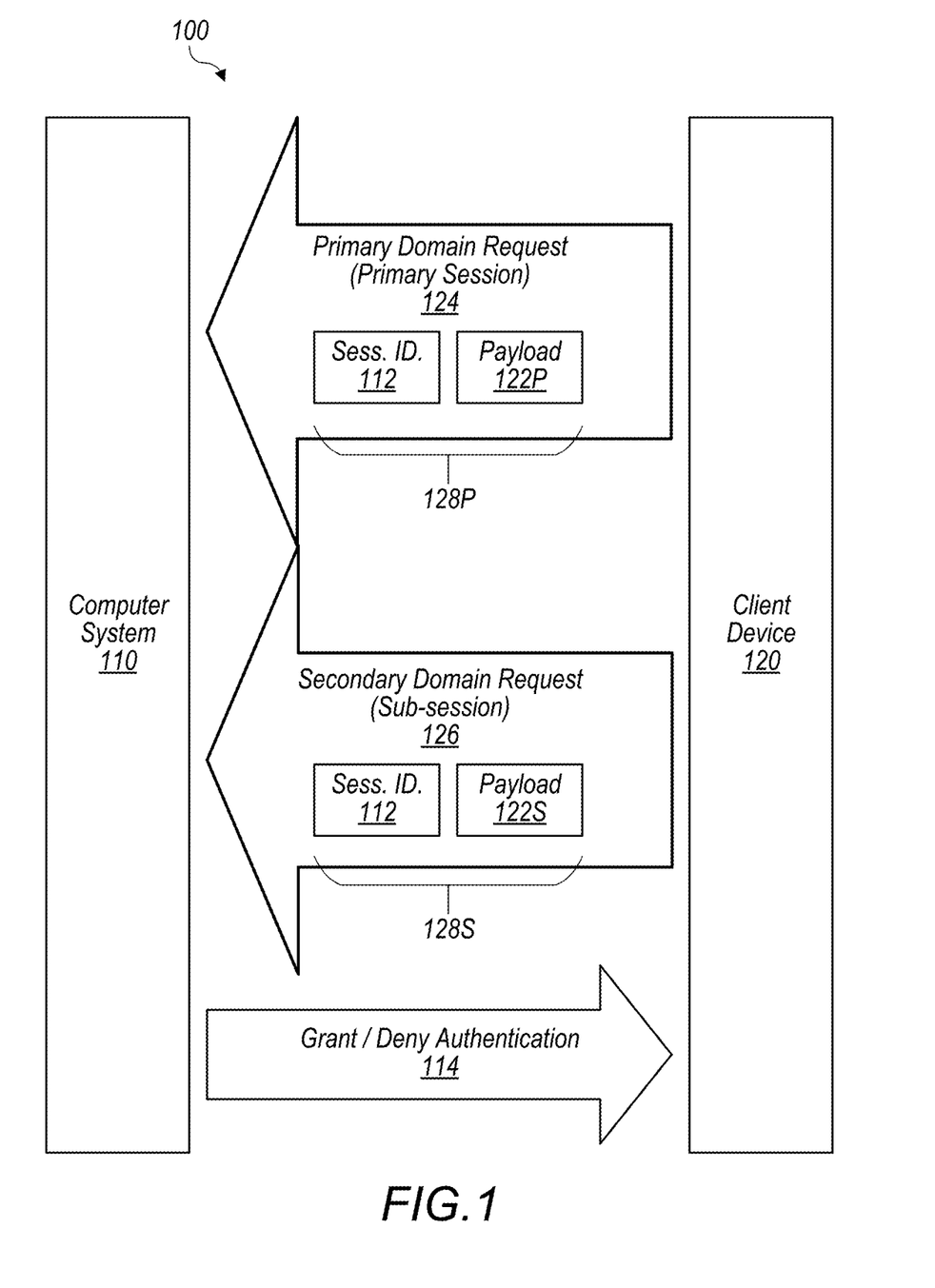
FIG. 1 is a block diagram illustrating an embodiment of a network that includes a computer system configured to authenticate a client device in a primary session and a sub-session.

Referring now to FIG. 1, a block diagram is shown illustrating an embodiment of a network 100 that includes a computer system 110 configured to authenticate a client device 120 in a primary session and a sub-session using derived authentication credentials. In various embodiments, the components of network 100 are remote from each other and communicate over a LAN and/or WAN (e.g., the Internet) using wired and/or wireless transmission media.

Computer system 110 is one or more computer systems operable to authenticate client device 120 in a primary session and one or more subs-sessions. In various embodiments, computer system 110 is implemented by software running on a computer system (e.g., a desktop computer, a laptop computer, a tablet computer, a mobile phone, a server) or a plurality of computer systems (e.g., a network of servers operating as a cloud). In other embodiments, computer system 110 is implemented in specialized hardware (e.g., on an FPGA) or in a combination of hardware and software. In various embodiments, security computer system 110 is operable to perform other functions in addition to authenticating client device 120 and replying to requests from client device 120. In various embodiments, computer system 110 is a multi-tenant computer system 110 operable to allow shared access to various entities with logical separation between the various entities' information to ensure data privacy. Various components of computer system 110 are discussed in further detail in reference to FIG. 2.

Client device 120 is one or more computer systems operable to request information from one or more primary domains and/or secondary domains (e.g., a primary domain 240 shown in FIG. 2, a secondary domain 242 shown in FIG. 2) and to authenticate itself with computer system 110 using various authentication keys 128 (e.g., primary domain authentication key 128P, secondary domain authentication key 128S). In various embodiments, client device 120 is implemented by software running on a computer system (e.g., a desktop computer, a laptop computer, a tablet computer, a mobile phone, a server) or a plurality of computer systems (e.g., a network of servers operating as a cloud). In other embodiments, client device 120 is implemented in specialized hardware (e.g., on an FPGA) or in a combination of hardware and software. In various embodiments, client device 120 is operable to perform other functions in addition to requesting information from various domains and authenticating with computer system 110 (e.g., presenting a user interface to a user). Various components of client device 120 are discussed in further detail in reference to FIG. 4.

Client device 120 is configured to send a primary domain request 124 and one or more secondary domain requests 126 to computer system 110. Computer system 110 is configured to receive such primary domain requests 124 and secondary domain requests 126. After receiving primary domain request 124 and/or secondary domain request 126, computer system 110 sends reply 114 to client device 120. Reply 114 indicates a grant or denial of authentication in response to primary domain request 124 and/or secondary domain request 126 in various instances. In some instances, reply 114 includes information (e.g., files, scripts stored on a primary domain) requested by client device 120 in primary domain request 124. In other instances, reply 114 includes information (e.g., files, scripts, stored on a secondary domain) requested by client device 120 in secondary domain request 126.

Figure 2:
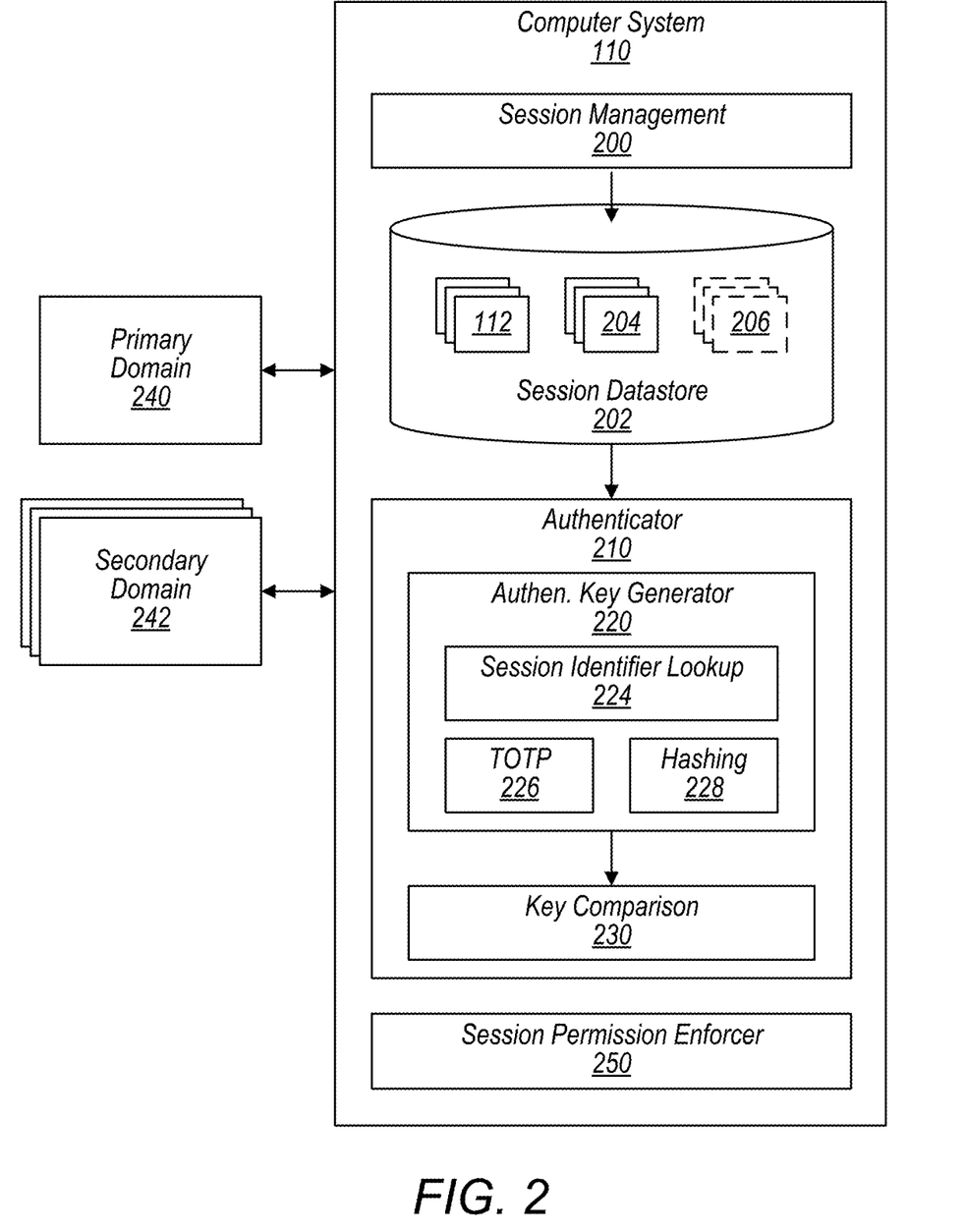
FIG. 2 is an expanded block diagram of the computer system of FIG. 1 in accordance with various embodiments.

Primary domain request 124 is a request to access information stored on a primary domain (e.g., a primary domain 240 shown in FIG. 2). Primary domain request 124 includes a primary domain authentication key 128P (also referred to herein as a "primary session authentication key") that is useable by computer system 110 to authenticate client device 120 in a primary session between computer system 110 and client device 120. Similarly, secondary domain request 126 is a request to access information stored on a secondary domain (e.g., a secondary domain 242 shown in FIG. 2). Secondary domain request 126 includes a secondary domain authentication key 128S (also referred to herein as a "sub-session authentication key") that is useable by computer system 110 to authenticate client device 120 in a sub-session between computer system 110 and client device 120. As discussed in further detail in reference to FIGS. 2-4, in various embodiments, primary domain authentication key 128P includes a copy of a session identifier ("session ID") 112 and a payload 122P that was generated using a session key (e.g., session key 204 shown in FIG. 2) and an indicator of the primary domain. Similarly, in various embodiments, secondary domain authentication key 128S includes a copy of the session identifier ("session ID") 112 and a payload 122S that was generated using the same session key as was used to generate payload 122P and an indicator of the secondary domain. In some embodiments, primary domain authentication key 128P does not include session ID 112 and payload 122P and instead primary domain authentication key 128P is a copy of the session key (e.g., session key 204 shown in FIG. 2). In such embodiments, computer system 110 is configured to authenticate primary domain request 124 by comparing the received primary domain authentication key 128P (i.e., a copy of the session key in these embodiments) to a copy of the session key stored at computer system 110.

As discussed in further detail herein, in various embodiments, the session ID 112 is the same for both the primary domain authentication key 128P and the secondary domain authentication key 128S, but the payload 122P differs from the payload 122S (e.g., because an indicator of the primary domain was used to generate payload 122P and because an indicator of the secondary domain was used to generate payload 122S). Accordingly, secondary domain authentication key 128S is said to be "derived" from the authentication credentials used in the primary session because the secondary domain authentication key 128S is generated using the same session ID 112 and the same session key. Because, however, payload 122P and payload 122S are different, the primary authentication key 128P and the secondary domain authentication key 128S are different, which is more secure than using the same authentication credentials in the primary session and the various sub-sessions because an authentication key 128P or 128S from a first domain is not usable to authenticate client device 120 in a second domain. In embodiments in which primary domain authentication key 128P is a copy of the session key, this is still the case because the session key would not be identical to the secondary domain authentication key 128S discussed herein.

Accordingly, the usage of sub-session authentication credentials that have been derived from the authentication credentials used in the primary session simplifies the usage of sub-sessions in secondary domains while maintaining the same level of security. Rather than maintaining a set of separate authentication credentials, computer system 110 maintains a set of information (e.g., session ID 112, session key 204) useable to generate the primary session authentication credentials and various derived authentication credentials. Thus, rather than having to ensure that when a primary session ends the various sub-sessions are also ended an all of the associated authentication credentials are invalided (e.g., terminated, expired), computer system 110 can simply invalidate the set of information usable to generate the authentication credentials for the primary session and various derived sub-sessions. Accordingly, computational overhead for computer system 110 is reduced.

Figure 4:
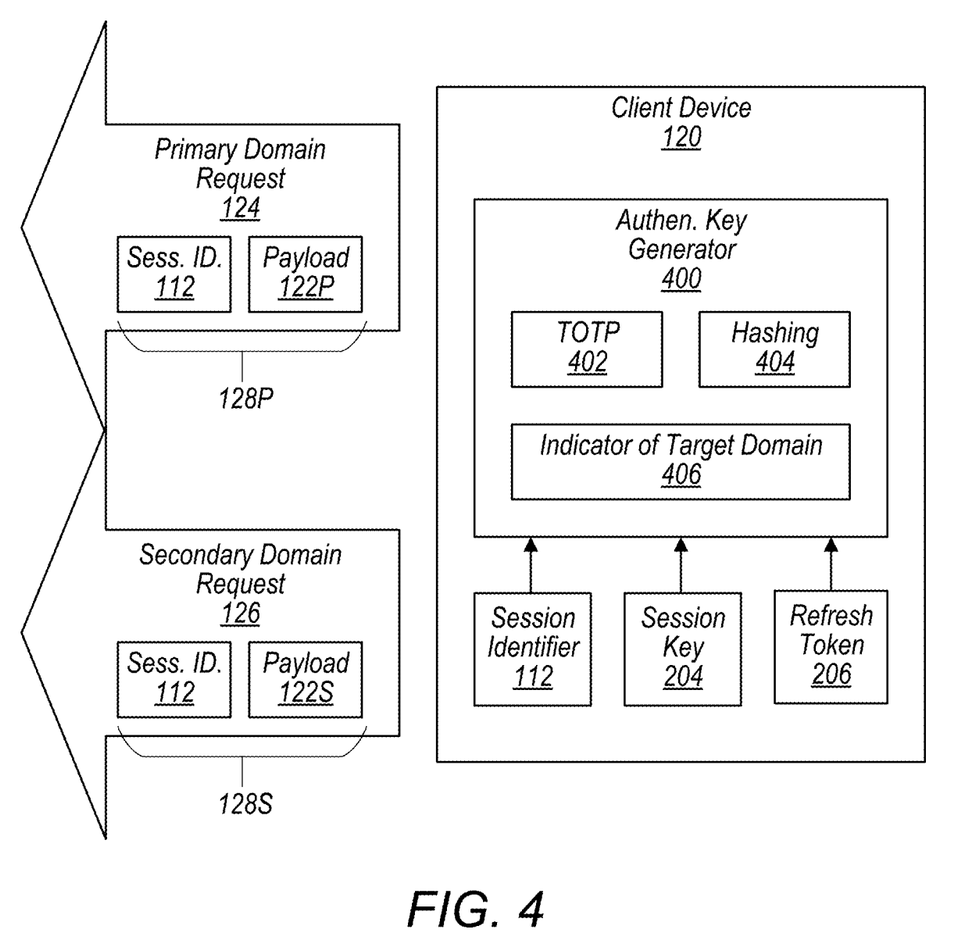
FIG. 4 is an expanded block diagram of the client device of FIG. 1 in accordance with various embodiments

As discussed herein in further detail in reference to FIG. 4, the usage of derived authentication credentials also improves the function of various client devices 120. The usage of derived authentication credentials reduces round-trip requests to computer system 110 (e.g., computer system 110 sends one set of information useable to generate various authentication credentials rather than sending multiple authentication credentials). Moreover, because only one set of information is needed to generate various authentication credentials, client device 120 only needs to maintain that one set of information rather than the various authentication credentials themselves resulting in less computer memory usage and, for developers, less complexity when developing applications for client devices 120 with flexibility to accommodate different numbers of sub-sessions. Further, because the authentication credentials for primary sessions and sub-sessions are not separately maintained, user experience is improved by avoiding circumstances in which a primary session is valid but a sub-session is improperly terminated, causing certain content or features to not load correctly on client device 120.

Referring now to FIG. 2, an expanded block diagram is shown illustrating computer system 110 in accordance with various embodiments. In various embodiments, computer system 110 is implemented as a platform operable to facilitate secure communications sessions between client device 120 and a primary domain 240 and one or more secondary domains 242 of the primary domain 240. In various embodiments, the various components of computer system 110 are implemented as modules. In various embodiments, computer system 110 includes a session management module 200, a session datastore 202, an authenticator module 210, and a session permission enforcer module 250.

Session management module 200 is operable to generate information discussed herein that is useable to generate authentication credentials for primary session communication between primary domain 240 and client device 120 and sub-session communication between one or more secondary domains 242 and client device 120. In various embodiments, session management module 200 is operable to store such information in session datastore 202. In various embodiments, session management module 200 is operable to maintain the session datastore 202 including but not limited to removing information useable to generate authentication credentials for particular primary sessions when the primary session ends (e.g., because of an expiration of the session, in response to a user "log out" command). As discussed herein, the tasks performed by session management module 200 are simplified relative to systems in which a similar component would be tasked with generating authentication credentials for both primary and sub-sessions as well as maintaining these authentication credentials in session datastore 202.

Session datastore 202 is operable to store information useable to generate authentication credentials as discussed herein as well as metadata about such information. Session datastore 202 is operable to store a plurality of session identifier 112 and a plurality of session keys 204. In some embodiments, session datastore 202 is also optionally operable to store a plurality of refresh tokens 206 (shown in dashed lines to indicate that this feature is not required). In various embodiments, session identifiers 112 and session keys 204 are generated by session management module 200 when client device 120 initiates a primary session (e.g., by logging into computer system 110 with a username and password). In various embodiments, session management module 200 is operable to generate refresh tokens 206 (e.g., when a user initially logs in at the beginning of the primary session).

In various embodiments, after a session ID 112 and session key 204 for a primary session have been generated, computer system 110 sends both to client device 120 for use in subsequent authentications. In some embodiments, session ID 112 and session key 204 are sent in the same message during the primary session, but in other embodiments session ID 112 and session key 204 are sent in separate messages during the primary session. As discussed herein, in various embodiments in which derived authentication keys are used for the primary session and the sub-sessions, neither session ID 112 nor session key 204 are sufficient to authenticate client device 120 during a primary session or a sub-session, so the risk of either or both being intercepted and used to "hijack" a session is reduced compared to an implementation in which the authentication computer system generates primary session and sub-session authentication credentials and sends such authentication credentials to the client device in a primary session. In various other embodiments in which derived authentication keys are used for the sub-session but a copy of session key 204 is used to authenticate in the primary session, session key 204 is sufficient to authenticate client device 120 during a primary session but is not sufficient to authenticate client device 120 in a sub-session.

Session ID 112 is useable to uniquely identify individual primary sessions. In various embodiments, session ID 112 is a numeric or alphanumeric identifier that is assigned to a primary session when the primary session is initiated (e.g., a user logs in to computer system 110 by entering a username and password into client device 120). In various embodiments, session IDs 112 are generated and assigned serially (e.g., 0001, 0002, 0003, 0004, etc.). In various embodiments, session IDs 112 are allocated to newly initiated primary sessions and then deallocated and made available for reuse when a primary session ends (e.g., due to expiration, due to user logout). In various embodiments, session ID 112 is fifteen characters long, but any number of characters (e.g., 5, 8, 10, 20, etc.) could be used. Session keys 204 are sequences of characters that are useable to generate authentication credentials for both a primary session and its corresponding sub-sessions. In various embodiments, session keys 204 are opaque tokens. In various embodiments, session keys 204 are randomly-generated sequences of numbers and/or letters. In various embodiments, session keys 204 are eight characters long, but any number of characters (e.g., 5, 8, 10, 20, etc.) could be used.

In various embodiments, refresh tokens 206 are optional, additional authentication tokens representing an end-user authorization over the OAuth protocol. In various embodiments, refresh tokens 206 are associated with a particular end user (e.g., a person using a particular user name) and may be useable to support additional security measures, such as tracking sessions generated from a particular end-user authorization, or invalidating sessions (e.g., by deleting a particular session ID 112 and session key 204) associated with a particular end user authorization. In various instances, a particular refresh token 206 may be associated with a plurality of primary sessions (e.g., a plurality of session IDs 112, a plurality of session keys 204). In embodiments in which a refresh token 206 is used, all primary and sub-sessions associated with the refresh token 206 may be terminated by invalidating the refresh token 206 (e.g., performing a lookup of a particular refresh token 206 and invalidating records of primary sessions that include the particular refresh token 206). In various embodiments, refresh tokens 206 are five characters long, but any number of characters (e.g., 5, 8, 10, 20, etc.) could be used. Session IDs 112, session keys 204, and refresh tokens 206 are discussed in further detail with examples in reference to FIG. 3.

Authenticator module 210 is operable to receive primary domain authentication key 128P and secondary domain authentication key 128S and determine whether they can be authenticated and whether the primary domain request 124 and secondary domain requests 126 should be granted or denied. In various embodiments, authenticator module 210 performs this authentication by (a) receiving the primary domain authentication key 128P or secondary domain authentication key 128S, (b) with an authentication key generator module 220, generating an authentication key using the primary domain authentication key 128P or secondary domain authentication key 128S, and (c) with a key comparison module 230, comparing the generated authentication key to the received primary domain authentication key 128P or secondary domain authentication key 128S. In some embodiments, primary domain authentication key 128P does not include session ID 112 and payload 122P and instead primary domain authentication key 128P is a copy of the session key (e.g., session key 204 shown in FIG. 2). In such embodiments, authenticator module 210 is operable to authenticate primary domain request 124 by comparing the received primary domain authentication key 128P (i.e., a copy of the session key 204 in these embodiments) to a copy of session key 204 stored in session datastore 202. In various embodiments, primary sessions expire after a certain amount of time and/or are terminated when a user logs out. In such embodiments, authenticator module 210 is operable to access session datastore 202 to determine whether a primary session has expired or been terminated.

Authentication key generator module 220 is operable to generate an authentication key using a session key 204 and an indicator of the target domain of the corresponding primary domain request 124 or secondary domain requests 126. In various embodiments discussed below, authentication key generator 220 also uses a refresh token 206 and/or time-based one-time password (TOTP) generated by a TOTP module 226 to generate the authentication key. In various embodiments, authentication key generator module 220 includes a session identifier lookup module 224 and a hashing module 228.

In various embodiments, the received primary domain authentication key 128P or received secondary domain authentication key 128S includes a copy of the session ID 112 (e.g., the first fifteen characters of the primary domain authentication key 128P or secondary domain authentication key 128S is the session ID 112). In such embodiments, a session identifier lookup module 224 is operable to receive the session ID 112 from the received primary domain authentication key 128P or received secondary domain authentication key 128S. Session identifier lookup module 224 is further operable to use the session ID 112 to look up the corresponding session key 204 (and in some embodiments, the corresponding refresh token 206) for the particular session from session datastore 202. In various embodiments, session ID 122 may be inserted in any part of the primary domain authentication key 128P or secondary domain authentication key 128S. In some embodiments, session ID 112 is concatenated with the payload 122P or 122S at the beginning of the primary domain authentication key 128P or secondary domain authentication key 128S. In other embodiments, session ID 112 is appended after payload 122P or 122S. In still other embodiments, session ID 112 may be interwoven into payload 122P or 122S in one or more portions (e.g., a first 20 character portion of payload 122P, 5 characters of the session ID 112, a second 60 character portion of payload 122P, the remaining 15 characters of the session ID 112, and the remaining portion of payload 122P).

TOTP module 226 is operable to generate a TOTP based on a seed value and the current time. In various instances, session key 204 is used as the seed value for the TOTP. In various embodiments, a TOTP is valid for a relatively long amount of time (e.g., one hour, five hours). In various instances, the period of time for which a TOTP is selected based on latency between computer system 110 and client device 120 such that for a relatively low-latency connection an even shorter period of time can be used to increase security and for a relatively high-latency connection a longer period of time can be used to accommodate the slower transmission of information. In various embodiments, the received primary domain authentication key 128P or secondary domain authentication key 128S includes an indication of the TOTP validity time period used to generate the TOTP that was in turn used to generate primary domain authentication key 128P or secondary domain authentication key 128. For example, primary domain authentication key 128P or secondary domain authentication key 128S may include the TOTP time period used after the session ID 112 and followed by a delimiter and then followed by the payload 122P or 122S. For example, a primary domain authentication key 128P may be "00x0000000000002$FDFF13A9575A2A40D0601BB3CA84811F57155773123BF5172861 8E69C5CF4323" in which 00x000000000000 is the session ID 112 followed by "2" indicating the TOTP time period in hours followed by delimiter "$" and the payload 122P "FDFF13A9575A2A40D0601BB3CA84811F57155773123BF51728618E69C5CF4323."

In various embodiments, authentication key generator module 220 uses a hashing module 228 to generate the authentication key. In particular, hashing module 228 is operable to generate a payload portion of the authentication key (also referred to herein as an "authentication payload") corresponding to payload 122P or payload 122S. In various embodiments, the authentication key uses the same format as the primary domain authentication key 128P or secondary domain authentication key 128S (e.g., a session ID 112 concatenated with a payload 122P or 122S). In other embodiments, the authentication key does not include the session ID 112 (e.g., the authentication key has the same format at the payload 122P or 122S). Hashing module 228 is operable to receive the information useable to generate primary domain authentication key 128P or secondary domain authentication key 128S and use a hashing function to generate the authentication key. In various embodiments, primary domain authentication key 128P, secondary domain authentication key 128S, and the corresponding authentication keys are generated using a Secure Hash Algorithm 2 (SHA-2) one-way hashing algorithm (e.g., SHA256, SHA512) although any hashing algorithm could be used.

In various embodiments, hashing module 228 generates a hash using the session key 204 (looked up from session datastore 202 by session identifier lookup module 224 using the session ID 112 included with the received primary domain authentication key 128P or secondary domain authentication key 128S) and an indication of the domain (e.g., primary domain 240, a secondary domain 242) associated with the primary domain request 124 or secondary domain requests 126. For example, primary domain request 124 or secondary domain requests 126 may be a request to FIG. 2B is an analysis image obtained from FIG. 2A. access information stored at location in the respective primary domain 240 or secondary domain 242 (e.g., information located at primary.domain.com, information located at secondary.secondarydomain.com), and this location is used as the indication on of the domain. In various embodiments, hashing module 228 may also use a refresh token 206 and or TOTP generated by TOTP module 226 to generate the hash. In various embodiments, hashing module 228 is operable to add the corresponding session ID 112 to the generated hash (e.g., concatenating session ID 112 before or after the hash, interweaving session ID 112 with the hash).

In a first embodiment, hashing module 228 is operable to generate an authentication key using a session ID 112, a session key 204, and an indicator of the target domain according to the following pseudocode:

<Primary Session's Session ID 112> + SHA256(<Primary Session's Session Key 204> + <Target Domain>)

If the session ID 112 is "000x00000000000," the session key 204 is ABCD1234, and the target domain is primary.domain.com, the resulting authentication key would be 000x00000000000 a6b1bb5916b20f1f440b0f80e8194d23adaf08f1cb968da67 bad24352e7480b6. If the session ID 112 is "000x00000000000," the session key 204 is ABCD1234, and the target domain is secondary1.secondarydomain.com, the resulting authentication key would be 000x00000000000 278fd66981be3 cd5030f5389351ab6ceb244e809484e7c4a145a85a1bf8c9f ce.

In a second embodiment, hashing module 228 is operable to generate an authentication key using a session ID 112, a session key 204, an indicator of the target domain, and a refresh token 206 according to the following pseudocode:

<Primary Session's Session ID 112> + SHA256(<Primary Session's Session Key 204> + <Target Domain> + <Primary Session's Refresh Token 206>).

If the session ID 112 is "000x00000000000," the session key 204 is ABCD1234, the target domain is primary.domain.com, and the refresh token 206 is "QQ999," the resulting authentication key would be 000x00000000000 177aead1e1037b8738c67f7c286749faaaf403ee2e0315ae1f 9630717ea7a7b3. If the session ID 112 is "000x00000000000," the session key 204 is ABCD1234, the target domain is secondary1.secondarydomain.com, and the refresh token 206 is "QQ999," the resulting authentication key would be 000x00000000000 739087adc9919bec6830dc3951a38cc3f33a7405e78b3df88 edd60eb0deb2823.

In a third embodiment, hashing module 228 is operable to generate an authentication key using session ID 112, a session key 204, an indicator of the target domain, a refresh token 206, and a TOTP token generated by TOTP module 226 according to the following pseudocode:

<Primary Session's Session Id> + <TOTP Period in Hours> + "$" + SHA256(<Primary Session's Session Key 204> + <Target Domain> + <Primary Session's Refresh Token 206>) + <TOTP Token using Session Key 204 as seed>).

If the session ID 112 is "000x00000000000," the TOTP period is 2 hours, the delimiter is "$," the session key 204 is ABCD1234, the target domain is primary.domain.com, the refresh token 206 is "QQ999," and the TOTP token is 12345, the resulting authentication key would be 000x00000000002$ c6c5eb5ea5934c1af0531afa9832c6a50de90044f6dd05fbb3 4868ae462e1d16. If the session ID 112 is "000x00000000000," the TOTP period is 2 hours, the delimiter is "$," the session key 204 is ABCD1234, the target domain is secondary1.secondarydomain.com, the refresh token 206 is "QQ999," and the TOTP token is 12345, the resulting authentication key would be 000x00000000002$ 46fb46d0a1341348bb55b0c83d2123ffa97b3011ba882bccc 4f99c65079af9e9.

As can be seen in the examples above, using different target domains as an input to the hashing algorithm results in different hashes, even when the session ID 112, session key 204, refresh token 206, and TOTP token are identical. Thus, different authentication keys are generated for different target domains as a result of the target domains themselves being different. As discussed in reference to FIG. 4, because the primary domain authentication key 128P and secondary domain authentication keys 128S are generated in the same manner, the authentication key generated as a result of receiving primary domain authentication key 128P or secondary domain authentication key 128S can simply be compared to the received authentication key 128P, 128S by key comparison module 230. If key comparison module 230 determines that the authentication key generated by authentication key generator module 220 matches the received authentication key 128P, 128S, then the received authentication key 128P, 128S can be authenticated and the corresponding request can be granted. If, however, the generated authentication key and the received authentication key 128P, 128S do not match, the received authentication key 128P, 128S is not authenticated. As discussed above, if the target domain for the request 124, 126 does not match the target domain used to generate payload 122P, 122S, then the generated authentication key and the received authentication key 128P, 128S will not match and the request 124P, 124S should be denied. Thus, if an authentication key 128S is used in an attempt to hijack the primary session in a malicious request 124, computer system 110 would deny the malicious request because the authentication key 128S would be invalid in the primary session. Similarly, authentication keys 128S cannot be used outside the secondary domain 242 for which they were generated because a first authentication key 128S for a first secondary domain 242 would be different from an authentication key generated for a second secondary domain 242.

As discussed herein, computer system 110 controls access to primary domain 240 and one or more secondary domains 242. In various embodiments, primary domain 240 is usable, for example, to control a user interface that is presented to a user via a properly authenticated client device 120. The various secondary domains 242 may be used to store information that may have increased security risks such as user-generated content that might, for example, have viruses or other malicious code. By separating such information from other secondary domains 242 and from the primary domain 240, security breaches can be reduced in scope to just the affected secondary domain 242. In some embodiments, primary domain 240 and secondary domain 242 can be accessed using respective URLs. In some embodiments, the respective URLs for primary domain 240 and secondary domain 242 share the same second level domain (e.g., primary domain 240 is located at primary.domain.com and secondary domain 242 is located at secondary1.domain.com). In other embodiments, however, primary domain 240 and secondary domain 242 do not share the same second level domain. For example, if a script included in a custom website stored on customwebsite.secondarydomain.com other has malicious code that hijacks the sub-session with computer system 110, if the techniques disclosed herein are employed, the hijacker would not be able to access information stored at secondary1.secondarydomain.com or primary.domain.com because the authentication key 128S useable to authenticate with customwebsite.secondarydomain.com would not be useable to authenticate with secondary1.secondarydomain.com or primary.domain.com.

In various embodiments, session permission enforcer module 250 is operable to further increase security by enforcing limits on requests that can be made to various domains. Some domains may be permitted to load documents and not run scripts where as other domains may be permitted to run scrips but not load documents. If, for example, a first secondary domain 242 customwebpages.secondarydomain.com is permitted to run Javascript as part of implementing custom webpages but a second secondary domain 242 images.secondarydomain.com is only permitted to load images, then a request to second secondary domain 242 to run a Javascript would be denied by session permission enforcer module 250 because the request to run a Javascript is outside the scope of permitted requests to second secondary domain 242. Additionally or alternatively, in various embodiments, session permission enforcer module 250 is operable to restrict access to particular types of data based on the domain in which a request for such data is made. For example, a request to the primary domain may be allowed to load an email address from a specific API that facilitates rendering of the UI provided by the primary domain. In various embodiments, this specific API is not accessible from the secondary domain. As a result, even if the sub-session is hijacked, an attacker would not have access to the email address because the API used to load it is not accessible from the sub-session.

Figure 3:
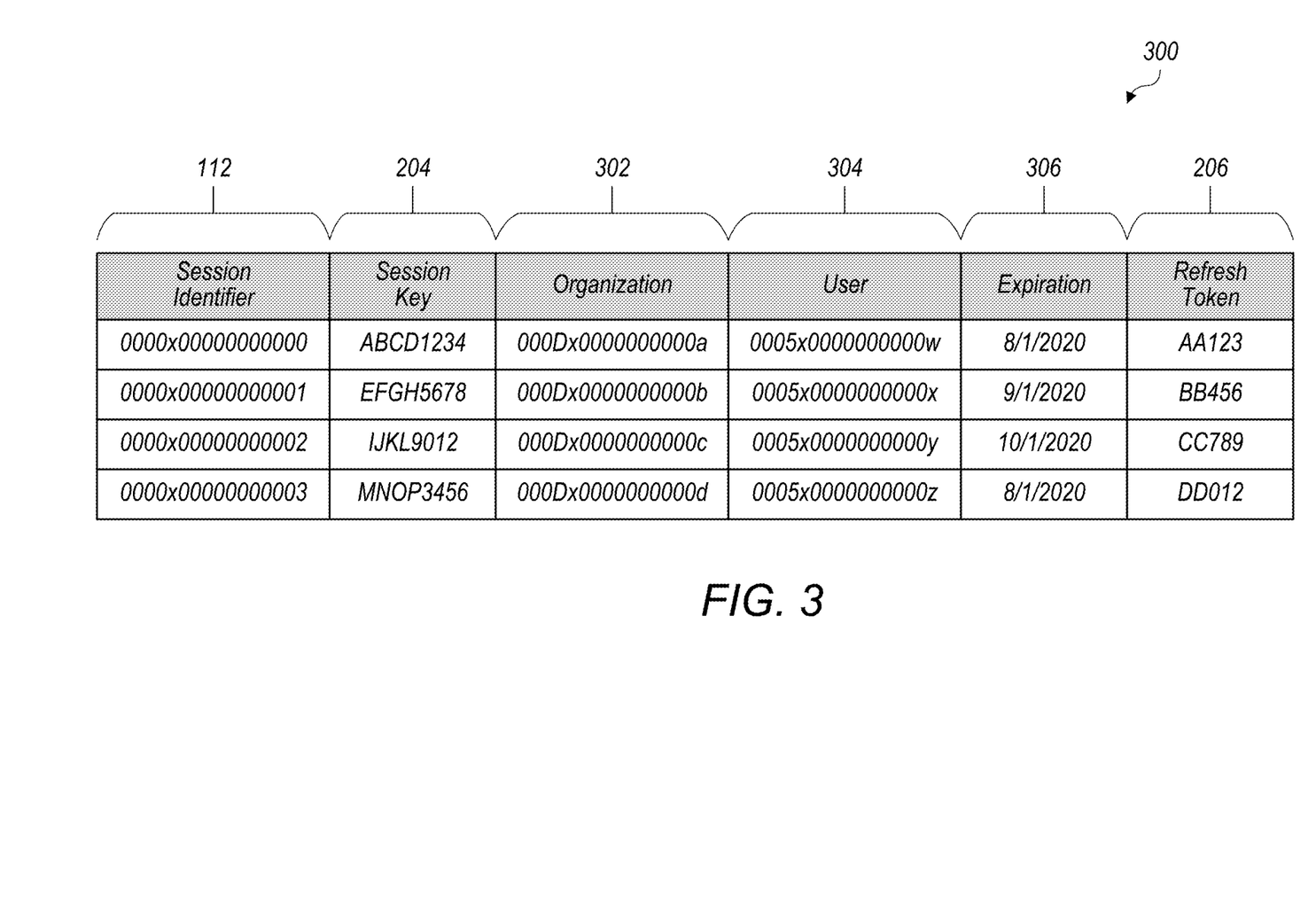
FIG. 3 is an example of a lookup table stored at the computer system of FIG. 1 having information useable to authenticate a client device in a primary session and a sub-session in accordance with various embodiments.

Referring now to FIG. 3, an example of a lookup table 300 is shown. In various embodiments, lookup table 300 is stored at computer system 110 (e.g., in session datastore 202) and includes information useable to authenticate client device 120 in a primary session and a sub-session in accordance with various embodiments. In various embodiments, such information includes but is not limited to session IDs 112, session keys 204, and refresh tokens 206. In various embodiments, lookup table 300 also includes additional information such as various organization indications 302, user indications 304, and session expiration indications 306 corresponding to various primary sessions.

Organization indications 302 and user indications 304 correspond to the organization identity and user identity corresponding to a particular primary session, respectively. For example, if a primary session is begun when a user logs in to computer system 110 via client device 120, the user's username would correspond to the user indication 304 and the user's employer or business unit corresponds to the organization indication 302. Accordingly, computer system 110 may be used to provide sessions that can account for multi-tenancy for various users and for various organizations. For example, a first primary session associated with user John Smith of Smith Corp. can be logically separated from a second primary session with user Samantha Smith of Smith Corp. or a third primary session with user Paul Johnson of Johnson, Inc.

Session expiration indications 306 correspond the amount of time remaining before a particular session expires. This amount of time may be for any period of time (e.g., hours, days, months, etc.). In various embodiments, when a user presents valid credentials (e.g., username, password, second factor authentication, etc.) to computer system 110 via client device 120 a session is initiated and authentication information is distributed as disused herein. When a user subsequently access computer system 110, if the primary session is still valid, then instead of the user having to present their credentials again, the primary domain authentication key 128P and secondary domain authentication key 128S may be presented as discussed herein, which streamlines the user experience. For security purposes, however, primary sessions may have a predetermined expiration date such that when a user tries to login after the primary session has expired, they will again have to present valid credentials. This expiration date may be stored in session datastore 202 as shown in the session expiration indications 306. As discussed herein, however, because the information useable to generate authentication credential such as session ID 112 and session key 204 is the same for both primary session and sub-sessions, only one expiration date has to be tracked in various embodiments. Accordingly, a sub-session remains valid as long as the primary session remains valid. Further, as discussed herein, when a particular primary session has ended due to expiration or early termination due to the user logging out, the information useable to generate authentication credentials for that particular primary session is deleted from session datastore 202. As shown in FIG. 3, for example, when the primary sessions with session IDs 112 0000x00000000000 and 0000x00000000003 expire after Aug. 1, 2020, the first and fourth rows may be deleted from lookup table 300.

Referring now to FIG. 4, an expanded block diagram is shown of the client device 120 of FIG. 1 in accordance with various embodiments. In various embodiments, client device 120 is implemented as a platform operable to facilitate secure communications sessions between client device 120 and a primary domain 240 and one or more secondary domains 242 of the primary domain 240. In various embodiments, the various components of client device 120 are implemented as modules. In various embodiments, client device 120 includes an authentication key generator module 400 and has copies of session ID 112, session key 204, and (in some embodiments) refresh token 206. As discussed herein client device 120 receives session ID 112 and session key 204 computer system 110 at the beginning of the primary session. In various embodiments, client device 120 also receives refresh token 206 from computer system 110. As discussed above, neither session ID 112 nor session key 204 are sufficient to authenticate client device 120 in a sub-session in various embodiments.

In various embodiments, client device 120 includes an authentication key generator module 400, which is operable to generate primary session authentication key 128P and sub-session authentication key 128S in a manner that mirrors the generation of authentication keys by authentication key generator module 220 of computer system 110. In some embodiments, primary domain authentication key 128P is a copy of session key 204. In such embodiments, authentication key generator module 400 generates primary domain authentication key 128P by copying session key 204.

In various embodiments, authentication key generator module 400 is operable to generate an primary session authentication key 128P and sub-session authentication key 128S using a session ID 112, a session key 204, and indicator of the target domain 406 (e.g., a network location or URL of the primary domain 240 that is the target of primary domain request 124, a network location or URL of a secondary domain 242 of secondary domain request 126). In various embodiments discussed below, authentication key generator 220 also uses a refresh token 206 and/or time-based one-time password (TOTP) generated by a TOTP module 402 to generate the authentication key. In various embodiments, the primary domain authentication key 128P or secondary domain authentication key 128S includes a copy of the session ID 112 (e.g., the first fifteen characters of the primary domain authentication key 128P or secondary domain authentication key 128S is the session ID 112). In various embodiments, session ID 122 may be inserted in any part of the primary domain authentication key 128P or secondary domain authentication key 128S. In some embodiments, session ID 112 is concatenated with the payload 122P or 122S at the beginning of the primary domain authentication key 128P or secondary domain authentication key 128S. In other embodiments, session ID 112 is appended after payload 122P or 122S. In still other embodiments, session ID 112 may be interwoven into payload 122P or 122S in one or more portions (e.g., a first 20 character portion of payload 122P, 5 characters of the session ID 112, a second 60 character portion of payload 122P, the remaining 15 characters of the session ID 112, and the remaining portion of payload 122P).

In various embodiments, client device 120 includes a TOTP module 402, which, like TOTP module 226 of computer system 110, is operable to generate a TOTP based on a seed value and the current time. In various instances, session key 204 is used as the seed value for the TOTP.

In various embodiments, authentication key generator module 400 uses a hashing module 404 to generate the primary domain authentication key 128P and secondary domain authentication key 128S in manner that mirrors the function of hashing module 228 of computer system 110. In particular, hashing module 404 is operable to generate payload 122P or payload 122S for primary domain authentication key 128P or secondary domain authentication key 128S. Hashing module 404 is operable to receive the information useable to generate primary domain authentication key 128P or secondary domain authentication key 128S and use a hashing function to generate the primary domain authentication key 128P or secondary domain authentication key 128S. In various embodiments, primary domain authentication key 128P and secondary domain authentication key 128S are generated using a SHA-2 one-way hashing algorithm (e.g., SHA256, SHA512) although any hashing algorithm could be used.

In various embodiments, hashing module 404 generates a hash using the session key 204 and an indication of the target domain 406 (e.g., primary domain 240, a secondary domain 242) associated with the primary domain request 124 or secondary domain requests 126. For example, primary domain request 124 or secondary domain request 126 may be a request to access information stored at location in the respective primary domain 240 or secondary domain 242 (e.g., information located at primary.domain.com, information located at secondary1.secondarydomain.com). In various embodiments, hashing module 404 may also use a refresh token 206 and or TOTP generated by TOTP module 402 to generate the hash. In various embodiments, hashing module 404 is operable to add the corresponding session ID 112 to the generated hash (e.g., concatenating session ID 112 before or after the hash, interweaving session ID 112 with the hash).

In a first embodiment, hashing module 404 is operable to generate primary domain authentication key 128P and secondary domain authentication key 128S using a session ID 112, a session key 204, and an indicator of the target domain according to the following pseudocode:

<Primary Session's Session ID 112> + SHA256(<Primary Session's Session Key 204> + <Target Domain>)

When TOTP module 402 is used to generate a TOTP that is used to generate a primary domain authentication key 128P or secondary domain authentication key 128S, the TOTP validity time period is included in the resulting primary domain authentication key 128P or secondary domain authentication key 128S in various embodiments. For example, primary domain authentication key 128P or secondary domain authentication key 128 may include the TOTP time period used after the session ID 112 and followed by a delimiter and then followed by the payload 122P or 122S. For example, a secondary domain authentication key 128S may be "00x0000000000002$46fb46d0a1341348bb55b0c83d2123 ffa97b3011ba882bccc4f99c65079 af9e9" in which 00x000000000000 is the session ID 112 followed by "2" indicating the TOTP time period in hours followed by delimiter "$" and the payload 122S "46fb46d0a1341348bb55b0c83d2123ffa97b3011ba882bcc c4f99c65079e9e9."

If the session ID 112 is "000x00000000000," the session key 204 is ABCD1234, and the target domain is primary.domain.com, the resulting primary domain authentication key 128P would be 000x00000000000 a6b1bb5916b20f1f440b0f80e8194d23adaf08f1cb968da67 bad24352e7480b6. If the session ID 112 is "000x00000000000," the session key 204 is ABCD1234, and the target domain is secondary1.secondarydomain.com, the resulting secondary domain authentication key 128S would be 000x00000000000 739087adc9919bec6830dc3951a38cc3f33a7405e78b3df88 edd60eb0deb2823.

In a second embodiment, hashing module 404 is operable to generate primary domain authentication key 128P and secondary domain authentication key 128S using a session ID 112, a session key 204, an indicator of the target domain, and a refresh token 206 according to the following pseudocode:

\<Primary Session's Session ID 112\> + SHA256(\<Primary Session's Session Key 204\> + \<Target Domain\> + \<Primary Session's Refresh Token 206\>).

If the session ID 112 is "000x00000000000," the session key 204 is ABCD1234, the target domain is primary.domain.com, and the refresh token 206 is "QQ999," the resulting primary domain authentication key 128P would be 000x00000000000 177aead1e1037b8738c67f7c286749faaaf403ee2e0315ae1f 9630717ea7a7b3. If the session ID 112 is "000x00000000000," the session key 204 is ABCD1234, the target domain is secondary1.secondarydomain.com, and the refresh token 206 is "QQ999," the resulting secondary domain authentication key 128S would be 000x00000000000 739087adc9919bec6830dc3951a38cc3f33a7405e78b3df88 edd60eb0deb2823.

In a third embodiment, hashing module 404 is operable to generate primary domain authentication key 128P and secondary domain authentication key 128S using session ID 112, a session key 204, an indicator of the target domain, a refresh token 206, and a TOTP token generated by TOTP module 402 according to the following pseudocode:

\<Primary Session's Session Id\> + \<TOTP Period in Hours\> + "$" + SHA256(\<Primary Session's Session Key 204\> + \<Target Domain\> + \<Primary Session's Refresh Token 206\>) + \<TOTP Token using Session Key 204 as seed\>).

If the session ID 112 is "000x00000000000," the TOTP period is 2 hours, the delimiter is "$," the session key 204 is ABCD1234, the target domain is primary.domain.com, the refresh token 206 is "QQ999," and the TOTP token is 12345, the resulting primary domain authentication key 128P would be 000x000000000002$ c6c5eb5ea5934c1af0531afa9832c6a50de90044f6dd05fbb3 4868ae462e1d16. If the session ID 112 is "000x00000000000," the TOTP period is 2 hours, the delimiter is "$," the session key 204 is ABCD1234, the target domain is secondary1.secondarydomain.com, the refresh token 206 is "QQ999," and the TOTP token is 12345, the resulting secondary domain authentication key 128S would be 000x000000000002$ 46fb46d0a1341348bb55b0c83d2123ffa97b3011ba882bccc 4f99c65079e9e9.

In various embodiments, payloads 122P and 122S may be generated using session key 204, and an indicator of a target domain 406. In various embodiments, payloads 122P and 122S may be generating using a TOTP generated by a TOTP module 402 and/or a refresh token 206. A hashing module 404 is operable to generate a hashed value for the various payloads 122P and 122S. As with hashing module 228, hashing module 404 is operable to generate a hashed value using various inputs. In some embodiments, hashing module 404 implements a one-way hashing function (e.g., a SHA-2 hashing function) to generate a hashed value that is used as payload 122P or 122S.

As can be seen in the examples above, using different target domains as an input to the hashing algorithm results in different hashes, even when the session ID 112, session key 204, refresh token 206, and TOTP token are identical. Thus, different authentication keys are generated for different target domains as a result of the target domains themselves being different. In embodiments in which primary domain authentication key 128P is simply a copy of session key 205 and secondary domain authentication key 128S are derived from the session ID and session key 204 (and in embodiments refresh token 206 and/or a TOTP token), these various authentication keys 128P and 128S are still different because authentication key 128S is derived from (and is not a copy of) session key 204. Further, in either embodiment, different secondary domain authentication key 128S would be different because the target domains are different. As discussed in reference to FIG. 2, because authentication keys generated by computer system 110 are generated in the same manner as primary domain authentication key 128P and secondary domain authentication keys 128S, the authentication key generated as a result of receiving primary domain authentication key 128P or secondary domain authentication key 128S can simply be compared to the received authentication key 128P, 128S by computer system 110 to determine whether primary domain request 124 or secondary domain request 126 can be authenticated.

Figure 5:
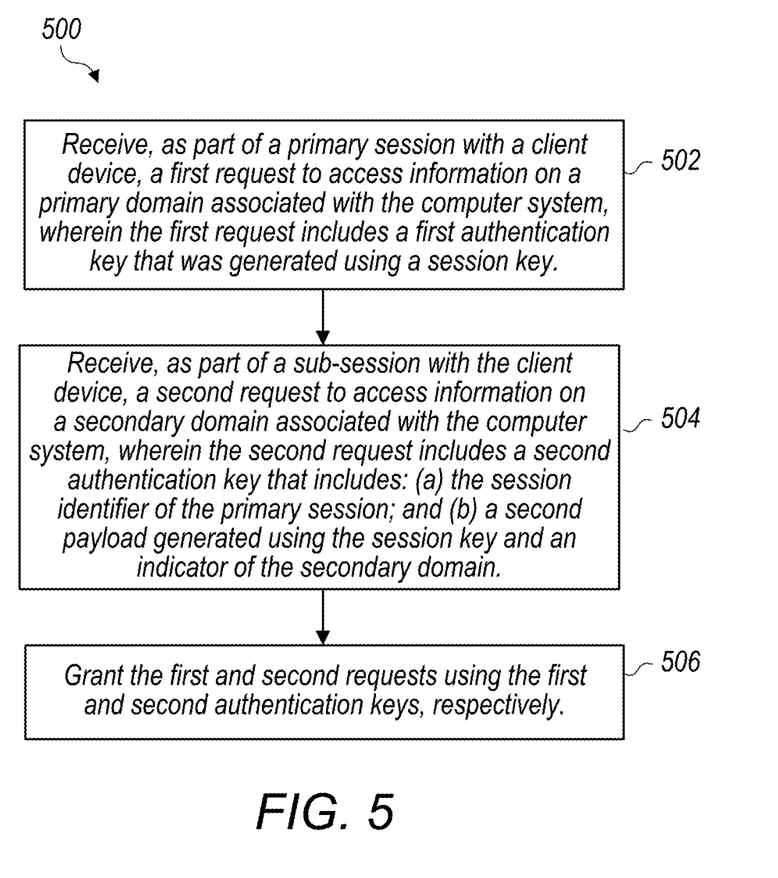
FIG. 5 is a flowchart illustrating an embodiment of a primary session and sub-session authentication method performed by the computer system of FIGS. 1 and 2 in accordance with various embodiments.
Figure 6:
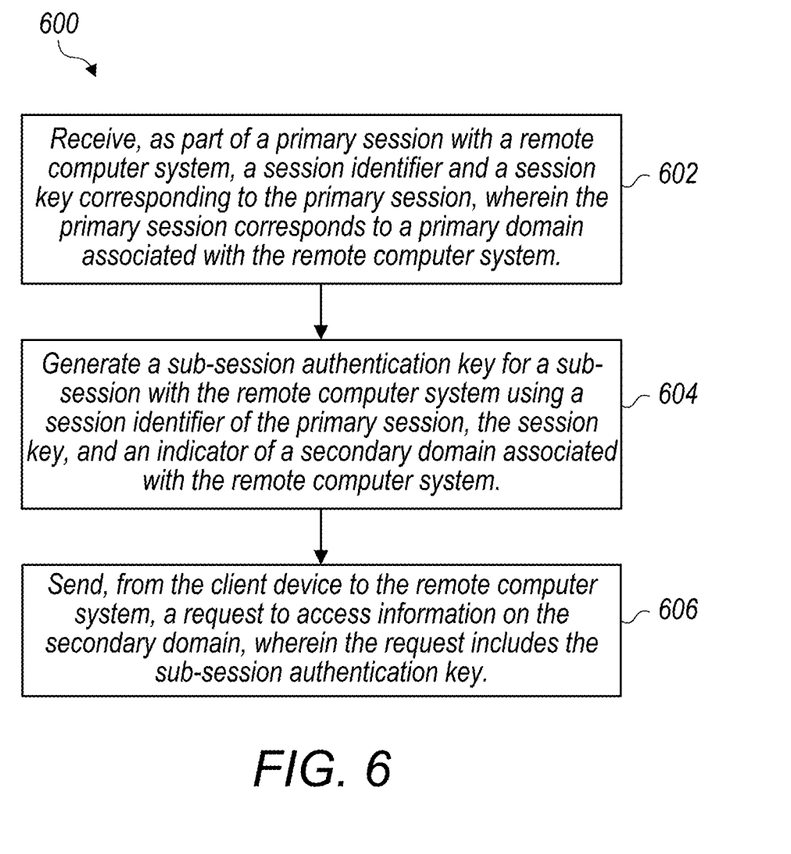
FIG. 6 is flowchart illustrating an embodiment of a primary session and sub-session authentication method performed by the client device of FIGS. 1 and 4 in accordance with various embodiments.

FIGS. 5 and 6 illustrate various flowcharts representing various disclosed methods implemented with computer system 110. Referring now to FIG. 5, a flowchart depicting a primary session and sub-session authentication method 500 is depicted. In the embodiment shown in FIG. 5, the various actions associated with method 500 are implemented by computer system 110. At block 502, computer system 110, receives, as part of a primary session with client device 120, a first request 124 to access information on a primary domain 240 associated with computer system 110, wherein the first request 124 includes a first authentication key 128P that was generated using a session key 204. At block 504, computer system 110, receives, as part of a sub-session with client device 120, a second request 126 to access information on a secondary domain 242 of the primary domain, wherein the second request 126 includes a second authentication key 128S that includes: (a) the session ID 112; and (b) a second payload 122S generated using session key 204 and an indicator (e.g., indicator of target domain 406) of a secondary domain 242. At block 506, computer system 110 grants the first and second requests 124, 126 using the first and second authentication keys 128P, 128S, respectively.

Referring now to FIG. 6, a flowchart depicting a primary session and sub-session authentication method 600 is depicted. In the embodiment shown in FIG. 6, the various actions associated with method 600 are implemented by client device 120. At block 602, client device 120 receives, as part of a primary session with remote computer system 110, a session identifier 112 and a session key 204 corresponding to the primary session, wherein the primary session corresponds to a primary domain 240 associated with remote computer system 110. At block 604, client device 120, generates a sub-session authentication key 128S for a sub-session with remote computer system 110 using session identifier 112, session key 204, and an indicator (e.g., indicator of target domain 406) of a secondary domain 242 of the primary domain 240. At block 606, client device 120 sends, from client device 120 to remote computer system 110, a secondary domain request 126 to access information on secondary domain 242, wherein secondary domain request 126 includes the sub-session authentication key 128S.

As non-limiting example of the disclosed techniques, a multi-tenant computer system 110 allows a plurality of organization to access the multi-tenant computer system 110 as tenants and for each of these organizations to enable users associated with the respective organizations (e.g., employees, contractors, etc.) to share the organizations' access. Among other functions, the multi-tenant computer system 110 provides its tenants with a customer relationship management platform that is usable to track the organizations' interactions with current and potential customers. The customer relationship management platform allows the various organizations to upload notes and photos relating to various customers, and also to create customized scripts that can aggregate data relating to customers. As discussed herein, because user-uploaded content has an associated security risk due to the increased ability of malicious code to be uploaded, the customer relationship management platform is segmented into a plurality of domains: a primary domain (primary.domain.com) that is operable to load the customer relation management user interface, a content secondary domain (content.secondarydomain.com) operable to load the notes and photos, and a script secondary domain (scripts.secondarydomain.com) operable to run the customized scripts.

When user John Smith of organization Smith, Inc. logs onto the multi-tenant computer system 110 using a client device 120, his tablet computer, he inputs his username and password into the customer relationship management platform mobile app. The multi-tenant computer system 110 sends a session ID 112 and a session key 204 to John's tablet, which stores both in the mobile app. The multi-tenant computer system 110 also stores a copy of the session ID 112 and the session key 204 in the session datastore 202. John then navigates to his customer metrics page to access information about his five biggest customers with images of each and the results of a customized script showing the sales last quarter to each. To load the user interface, the mobile app sends a primary domain request 124 to primary.domain.com with a primary domain authentication key 128P (session ID 112 concatenated with a payload 122P generated using the session key 204 and an indicator of primary.domain.com). To load the photos of the five biggest customers, the mobile app sends a first secondary domain request 126 to content.secondarydomain.com with a first secondary domain authentication key 128S (that includes the session ID 112 concatenated with a payload 122S generated using the session key 204 and an indicator of content.secondarydomain.com). To load the results of the customized script, the mobile app sends a second secondary domain request 126 to scripts.secondarydomain.com with a second secondary domain authentication key 128S (that includes the session ID 112 concatenated with a payload 122S generated using the session key 204 and an indicator of scripts.secondarydomain.com). The multi-tenant computer system 110 authenticates each request by looking up the session key 204 using the session ID 112, separately generating authentication keys for all three domains, and comparing the generated authentication keys to the received primary domain authentication key 128P, first secondary domain authentication key 128S, and second secondary domain authentication key 128S. After authenticating the mobile app, the multi-tenant computer system 110 facilitates loading the user interface, photos, and script results as requested. John then concludes the session by logging out of the mobile app. The multi-tenant computer system 110 receives an indication of the logout and deletes the session ID 112 and session key 204.

Exemplary Computer System

Figure 7:
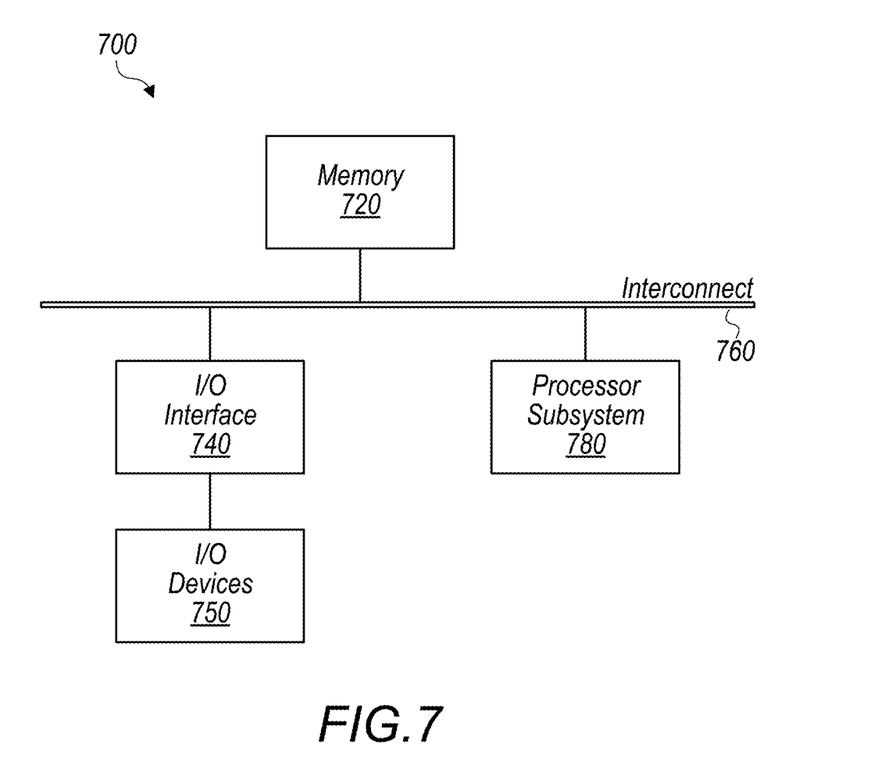
FIG. 7 is a block diagram of an exemplary computer system, which may implement the various components of FIGS. 1, 2, and 4.

Turning now to FIG. 7, a block diagram of an exemplary computer system 700, which may implement the various components of network 100 (e.g., computer system 110, client device 120) is depicted. Computer system 700 includes a processor subsystem 780 that is coupled to a system memory 720 and I/O interfaces(s) 740 via an interconnect 760 (e.g., a system bus). I/O interface(s) 740 is coupled to one or more I/O devices 750. Computer system 700 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 700 is shown in FIG. 7 for convenience, system 700 may also be implemented as two or more computer systems operating together.

Processor subsystem 780 may include one or more processors or processing units. In various embodiments of computer system 700, multiple instances of processor subsystem 780 may be coupled to interconnect 760. In various embodiments, processor subsystem 780 (or each processor unit within 780) may contain a cache or other form of on-board memory.

System memory 720 is usable to store program instructions executable by processor subsystem 780 to cause system 700 perform various operations described herein. System memory 720 may be implemented using different physical memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 700 is not limited to primary storage such as memory 720. Rather, computer system 700 may also include other forms of storage such as cache memory in processor subsystem 780 and secondary storage on I/O Devices 750 (e.g., a hard drive, storage array, etc.). In some embodiments, these other forms of storage may also store program instructions executable by processor subsystem 780.

I/O interfaces 740 may be any of various types of interfaces configured to couple to and communicate with other devices, according to various embodiments. In one embodiment, I/O interface 740 is a bridge chip (e.g., Southbridge) from a front-side to one or more back-side buses. I/O interfaces 740 may be coupled to one or more I/O devices 750 via one or more corresponding buses or other interfaces. Examples of I/O devices 750 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 700 is coupled to a network via an I/O device 750 (e.g., a network interface device configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method comprising:
    receiving, by a computer system as part of a primary session with a client device, a first request to access information on a primary domain associated with the computer system, wherein the first request includes a first authentication key that includes:
    a session identifier of the primary session; and
    a first payload generated using a session key and an indicator of the primary domain;
    receiving, by the computer system as part of a sub-session associated with the primary session of the client device, a second request to access information on a secondary domain associated with the computer system, wherein the second request includes a second authentication key that includes:
    the session identifier of the primary session; and
    a second payload generated using the session key and an indicator of the secondary domain; and
    granting, by the computer system, the first and second requests using the first and second authentication keys, respectively.

2. The method of claim 1, wherein granting the second request using the second authentication key includes:
    using the session identifier to look up the session key,
    generating an authentication payload using the session key and an indicator of the secondary domain, and
    matching the received second payload to the authentication payload.

3. The method of claim 1,
    wherein the second payload is generated using the session key, the indicator of the secondary domain, and a refresh token.

4. The method of claim 1,
    wherein the second payload is generated using the session key, the indicator of the secondary domain, and a time-based one-time password (TOTP) token, wherein the TOTP token is generated by the client device using the session key as a seed.

5. The method of claim 1,
    wherein the second authentication key includes the session identifier concatenated with the second payload, wherein the second payload is a one-way hash generated using the session key and the indicator of the secondary domain.

6. The method of claim 1, wherein the granting the second request includes determining that the primary session has not expired.

7. The method of claim 1, wherein granting the second request includes determining that the second request is permitted in the secondary domain.

8. A non-transitory computer readable medium having program instructions stored thereon that are capable of causing a computer system to perform operations comprising:
    receiving, as part of a primary session with a client device, a first request to access information on a primary domain associated with the computer system, wherein the first request includes a first authentication key that includes:
    a session identifier of the primary session; and
    a first payload generated using a session key and an indicator of the primary domain;
    receiving, as part of a sub-session associated with the primary session of the client device, a second request to access information on a secondary domain associated with the computer system, wherein the second request includes a second authentication key that includes:
    the session identifier of the primary session; and
    a second payload generated using the session key and an indicator of the secondary domain; and
    determining whether to authenticate the client device in the primary session and the sub-session using the first and second authentication keys, respectively.

9. The computer-readable medium of claim 8, wherein the operations further comprise:
    generating, by the computer system, the session identifier; and
    sending, from the computer system to the client device, the session identifier as part of the primary session.

10. The computer-readable medium of claim 8, wherein the operations further comprise:
    generating, by the computer system, the session key; and
    sending, from the computer system to the client device, the session key as part of the primary session;
    wherein the session key is not sufficient to authenticate the client device in the sub-session.

11. The computer-readable medium of claim 8:
    wherein the primary session expires after a period of time; and
    wherein the sub-session remains valid as long as the primary session is valid.

12. The computer-readable medium of claim 8, wherein the operations further comprise:
    receiving, from the client device, a third request to access information on the primary domain, wherein the third request includes an invalid authentication key that includes:
    the session identifier; and
    a third payload generated using the session key and an indicator of the secondary domain; and
    rejecting the third request based on the invalid authentication key.

13. The computer-readable medium of claim 8, wherein the operations further comprise:
    storing, at the computer system, the session identifier and the session key; and
    in response to determining that the primary session has ended, deleting, by the computer system, the session identifier and the session key.

14. A non-transitory computer readable medium having program instructions stored thereon that are capable of causing a client device to perform operations comprising:
    receiving, as part of a primary session with a remote computer system, a session identifier for the primary session and a session key, wherein the primary session corresponds to a primary domain associated with the remote computer system;

sending, from the client device to the remote computer system, a first request to access information on the primary domain, wherein the first request includes a primary session authentication key, for the primary session, that includes:
    the session identifier for the primary session; and
    a first payload generated using the session key and an indicator of the primary domain;
generating a sub-session authentication key for a sub-session associated with the primary session of the remote computer system using the session identifier for the primary session, the session key, and an indicator of a secondary domain associated with the remote computer system; and
sending, from the client device to the remote computer system, a second request to access information on the secondary domain, wherein the second request includes the sub-session authentication key.

15. The computer-readable medium of claim 14, wherein the operations further comprise:
    generating, with the client device, the primary session authentication key using the session identifier, the session key, and an indicator of the primary domain.

16. The computer-readable medium of claim 14, wherein the operations further comprise:
    receiving, at the client device, a refresh token;
    wherein generating the sub-session authentication key includes using the session identifier for the primary session, the session key, the indicator of the secondary domain, and the refresh token.

17. The computer-readable medium of claim 14, wherein the operations further comprise:
    generating, with the client device, a time-based one-time password (TOTP) token using the session key as a seed;
    wherein generating the sub-session authentication key includes using the session identifier, the session key, the indicator of the secondary domain, and the TOTP token.

18. The computer-readable medium of claim 14,
    wherein generating the sub-session authentication key includes concatenating the session identifier with a one-way hash generated using the session key and the indicator of the secondary domain.

19. The computer-readable medium of claim 14, wherein the session key is not sufficient to authenticate the client device in the sub-session.

* * * * *